United States Patent

Singh et al.

[11] Patent Number: 5,544,204
[45] Date of Patent: Aug. 6, 1996

[54] METHOD OF INFLUENCING THE REACTIVITY OF A NEUTRON CHAIN REACTION IN A NUCLEAR REACTOR

[75] Inventors: Jasbir Singh, Julich; Heiko Barnert, Langerwehe, both of Germany

[73] Assignee: Forschungszentrum Julich GmbH, Julich, Germany

[21] Appl. No.: 400,132

[22] Filed: Mar. 6, 1995

Related U.S. Application Data

[63] Continuation of Ser. No. 114,325, Aug. 30, 1993, abandoned.

[30] Foreign Application Priority Data

Sep. 1, 1992 [DE] Germany .................. 42 29 091.0

[51] Int. Cl.⁶ ..................................... G21C 7/30
[52] U.S. Cl. .................. 376/213; 376/338; 376/355
[58] Field of Search ........................... 376/212, 213, 376/208, 338, 355, 356

[56] References Cited

U.S. PATENT DOCUMENTS

| | | | |
|---|---|---|---|
| 2,990,349 | 6/1961 | Roman | 376/355 |
| 3,005,764 | 10/1961 | Daniels | 376/355 |
| 3,046,212 | 7/1962 | Anderson | 376/355 |
| 3,050,454 | 8/1962 | Barr et al. | 376/356 |
| 3,058,897 | 10/1962 | Slack et al. | 376/355 |
| 3,085,060 | 4/1963 | Russell | 376/338 |
| 3,228,850 | 1/1966 | Fellows | 376/355 |
| 3,244,597 | 4/1966 | Tower | 376/213 |
| 3,287,910 | 11/1966 | Silverstein | 376/355 |
| 3,438,856 | 4/1969 | Ripley | 376/213 |
| 4,076,583 | 2/1978 | Ash et al. | 376/338 |

FOREIGN PATENT DOCUMENTS

| | | | |
|---|---|---|---|
| 619684 | 5/1961 | Canada | 376/213 |
| 788288 | 12/1957 | United Kingdom | 376/212 |

*Primary Examiner*—Harvey E. Behrend
*Attorney, Agent, or Firm*—Herbert Dubno

[57] ABSTRACT

The reactivity of a neutron chain reaction in a nuclear reactor is automatically reduced upon failure of the coolant flow by a system in which nuclear-fuel particles are suspended against gravitational forces by forces of the coolant flow and are in the reactive zone when so suspended. Upon failure of the coolant flow, the particles settle into a space outside the reactive zone and thus do not contribute to the neutron chain reaction and reactivity is reduced.

3 Claims, 2 Drawing Sheets

METHOD OF INFLUENCING THE REACTIVITY OF A NEUTRON CHAIN REACTION IN A NUCLEAR REACTOR

This is a continuation of application Ser. No. 08/114,325 filed on 30 Aug. 1993, now abandoned.

FIELD OF THE INVENTION

The present invention relates to a process for automatically, reliably, and, in a fail-safe manner, influencing the reactivity of a neutron chain reaction in a nuclear reactor, to a process of providing stable control of the reactivity of such a chain reaction, and to an apparatus for carrying out the method or process. To the extent that the invention deals with controlling reactivity, it may also be considered to involve a method of operating a nuclear reactor.

BACKGROUND OF THE INVENTION

The reactivity of a neutron chain reaction in a nuclear reactor is a measure of the relative multiplication rate of neutron production. In a stationary state normal operation, the reactivity is zero. To increase the output, the reactivity may be increased and to reduce the output, e.g. in terms of the power generated, the reactivity may be reduced.

Generally speaking in the nuclear reactor and in the region in which a fissionable fuel, also referred to as a nuclear fuel, provides the neutron flux, i.e. the reaction region of the nuclear reactor, the reactivity is primarily controlled by the effectiveness of neutron absorbers. For example, neutron-absorbing rods or elements can be introduced into the core of a nuclear reactor, i.e. into the neutron flux zone, to a greater or lesser extent, or the fuel rods may be shifted into a body of neutron-absorbing material to a greater or lesser extent. The introduction and retraction of the absorber rods, for example, reduce or increases the reactivity.

Apart from the settings of the rods to control reactivity, the reactivity is influenced in normal operation by many other parameters. Of the greatest importance is the danger of uncontrolled liberation of neutrons in cases of uncontrolled reactivity with the consequence of potential danger of an explosion like increase of neutron production and loss of control of the reactor. This can be great enough to damage the reactor core and thus the most important barrier or containment preventing escape of radio-active substances.

For this reason it is desirable to provide an automatic inherently reliable reduction in the reactivity of a neutron-chain reaction which can be built into the reactor and can in a fail-safe manner effect at least a limited reduction in the reactivity upon the development of an event necessitating that reduction, such as a loss of coolant flow. A system which can reduce reactivity intrinsically and automatically as the need arises, contributes to the stabilization or stable operation of the nuclear reactor and enables hot shutdown thereof.

Some systems have been provided heretofore to generate a self-stabilizing effect in the operation of nuclear reactors. These can include the provision of a nuclear fuel having a negative reactivity temperature coefficient, or can utilize the negative reactivity void coefficient of the boiling water in a boiling-water reactor in which boiling water surrounds the fuel.

In such cases a tendency toward a temperature increase will automatically reduce the reactivity and thereby lower the output in a self-stabilizing manner.

These earlier self-stabilizing systems are, however, incompletely effective and it is desirable to be able to provide additional self-stabilizing automatic reactivity-controlling effects in a nuclear reactor.

OBJECTS OF THE INVENTION

It is, therefore, the principal object of the present invention to provide a method of or process for and an apparatus for automatic stabilization of a neutron chain reaction in a nuclear rector.

Another object of our invention is to provide a process for controlling reactivity of a nuclear reactor and, in particular for the reactivity automatically and in a self-stabilizing manner, utilizing techniques other than those known heretofore and which can be used effectively alone or in conjunction with other techniques.

It is also an object of the invention to provide an improved process and apparatus for controlling the reactivity of a neutron chain reaction in a nuclear reactor which has advantages over earlier techniques.

SUMMARY OF THE INVENTION

These objects and others which will become apparent hereinafter are attained, in accordance with the invention, by providing a part of the nuclear fuel contributing to the neutron chain reaction so that it is subject to forces generated by a coolant flow and is maintained by these forces in the neutron-flux region, i.e. the active region of the nuclear reactor, but upon reduction of such forces, can be received in a space outside the reaction region to thereby withdraw this part of the nuclear fuel from contributing to the neutron flux and reduce the reactivity of the reactor.

The fuel-suspension force is provided during normal operating flow of coolant through the reactor, i.e. by branching a portion of the main coolant flow through sieve-like inlets and outlet openings of a longitudinal compartment in a direction opposite the direction in which gravity acts upon the fuel particles, i.e. upwardly, so that in normal operation the particles are fluidized by the coolant flow and are suspended in this compartment over the height thereof. Since the upper part of this compartment or the compartment above the space into which the fuel particles can fall for reactivity reduction, lies in the reaction region of the neutron chain reaction, the suspended fuel particles contribute to the chain reaction.

Upon failure of the coolant flow, however, the fuel can settle into the lowest part of the compartment, i.e. into a space below the reaction region and hence out of the normal flux, thereby reducing the reactivity and leading, upon appropriate dimensioning of the reactivity reduction, to a hot shutdown of the reactor.

Advantageously, the space and the fuel which can be contained therein are so dimensioned that the influence of this fuel upon the reactivity amounts to 0.5% to 1%. To vary the reactivity at this magnitude about 0.5% to 1% of the total fissionable fuel inventory must be contained in the upper part of the compartment when the coolant flow is normal and must be withdrawn from the reactive zone into space when the coolant flow fails. A reduction of the reactivity to values between −0.5% to −1% can result in hot shutdown of the reactor.

According to a feature of the invention, a portion of the fuel at least in the compartment and space should be coated fuel particles, i.e. fuel particles in, for example, a carbon coating. The flow through the compartment and space can be a portion of the main coolant flow branched therefrom, i.e. a branched stream which can support these fuel particles against the gravitation forces and which can be returned to the main coolant flow through the upper sieve structure which can screen the fuel particles from the coolant flow.

Coated fuel particles are commonly used in high-temperature reactors and in the case of the present invention, are carried upwardly by the branched flow of coolant entering the compartment through the lower sieve structure and are held in suspension by the flowing branched-coolant stream as long as the coolant flow is maintained. Should there be a defect in the coolant flow, these particles settle automatically out of the reactive region and reduce the reactivity in the manner described.

Advantageously, the branched stream can be passed through regions of the reactor free from fuel. In fast reactors the branched structure can be guided through the breeder blanket and with thermal reactors through the reflector.

According to yet another feature of the invention, the fuel in the compartment has a greater degree of enrichment than that in the remainder of the neutron flux or reactive zone. This increases the effectivity of the reactivity control system of the invention.

The process for the automatic stabilization of the reactivity of a neutron-chain reaction sustained by a fissionable fuel in neutron-flux zones of a nuclear reactor can comprise the steps of:

(a) supporting a part of the fissionable fuel in the zone by forces generated by a coolant flow into contact with the part of the fissionable fuel;

(b) providing below the zone a space for accumulation of the part of the fissionable fuel out of the neutron-flux zone; and (c) automatically causing the part of the fissionable fuel to collect by gravity in the space upon reduction of the forces, thereby reducing the reactivity of the chain reaction.

In apparatus terms, the apparatus for the automatic stabilization of the reactivity can comprise:

means forming a vertically elongated compartment in the zone within neutron flux therein;

sieve structures at opposite ends of the compartment for confining fine fissionable fuel particles therein, the compartment communicating with a space below the compartment and generally outside the zone;

means for connecting the compartment into a coolant stream for the nuclear reactor so that a coolant flow is branched from the main stream and flows through the compartment in a direction opposite the effect of gravity on the particles therein, whereby the coolant flow supports the particles in the zone and, upon reduction of the coolant flow, at least some of the fissionable fuel particles collect by gravity in the space upon reduction of supporting forces on the particles generated by the coolant flow, thereby reducing the reactivity of the chain reaction.

In this apparatus, an elongated compartment or hollow space is provided in the reactor core with its longitudinal axis parallel to the gravitational direction and with an upper part in the reaction region of the neutron-chain reactor. The sieve-like structures are provided at the ends of the compartment and the compartment is so connected to the main coolant flow that a branched or auxiliary coolant flow passes through the compartment in a direction opposite the action of gravity upon the fine-grained fuel particles in the compartment between the sieve structures.

During proper flow of the coolant, the fuel particles are in the reaction region and upon failure of the coolant flow automatically settle in the compartment out of the reactive region to automatically reduce the reactivity of the reactor. In reactors with an annular or ring-shaped reactor core, the compartment or hollow space is advantageously within a central column of the core.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
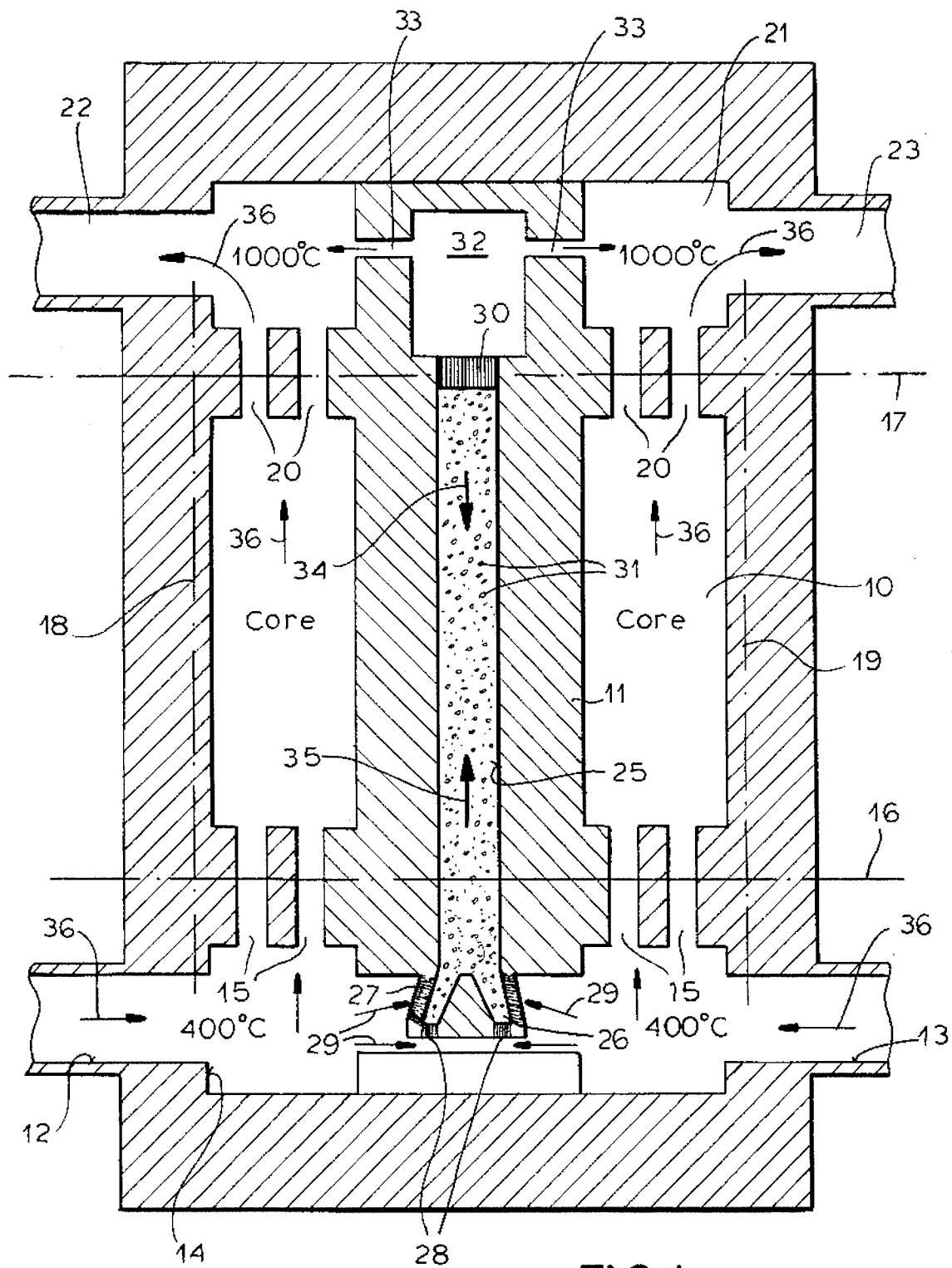
FIG. 1 is a diagrammatic section of a reactor showing the condition with effective coolant flow.

FIG. 1 shows a nuclear reactor having a ring-shaped reactor core 10, a central column 11 and a main supply of coolant represented by the inlets 12 and 13 extending to a space 14 distributing the main coolant flow to passages 15 opening into the core 10. The main body of fissionable fuel is received in the core and the reactive zone is represented between the horizontal planes 16 and 17 and within the annular region represented by the generatrices 18 and 19.

At the upper end of the reactor, passages 20 carry the heated coolant to an annular space 21 whence the coolant is lead away via the ducts 22 and 23 to the remainder of the main coolant circulation which can include an energy recovery system for producing electrical energy, heat-exchangers or the like for lowering the temperature of the coolant.

According to the invention, a reactivity-controlling system is provided in the form of a vertical compartment 25 within the central column 11, an upper portion of which is in the reactive zone and a lower portion of which is outside the reactive zone and the neutron flux thereof. The compartment 25 is disposed above the annular space 26 which also forms a distributing space for a portion of the coolant which can be admitted into this space via an annular sieve structure 27 and axial-sieve structures 28. The coolant flow through the compartment 25 is branched from the main coolant stream as represented by the arrows 29.

At the upper end of the chamber 25 is another sieve structure 30 which screens nuclear-fuel particles 31 in the compartment 25 from the branched coolant stream. The branched coolant stream which fluidizes masses of fuel particles 31 in the compartment 25 and forms an expanded bed thereof in the reactive zone, passes into a collecting chamber 32 from which the branched coolant returns at 33 to the main coolant flow.

Within the compartment 25 gravity acts on the coated fuel particles 31 in the direction of arrow 34 and thus the flow of branched coolant through this compartment is in the direction of arrow 35. Arrows 36 represent the main coolant flow through the reactor. As can be seen from FIG. 1, moreover, the sieve-like structures 27, 28, 30 are so constructed that the fuel particles 31 cannot pass from the compartment 25 either upwardly or downwardly, but can be held suspended in the reaction region as long as the main coolant flow is sustained and, of course, as long as there is a branched fluidizing coolant flow.

Figure 2:
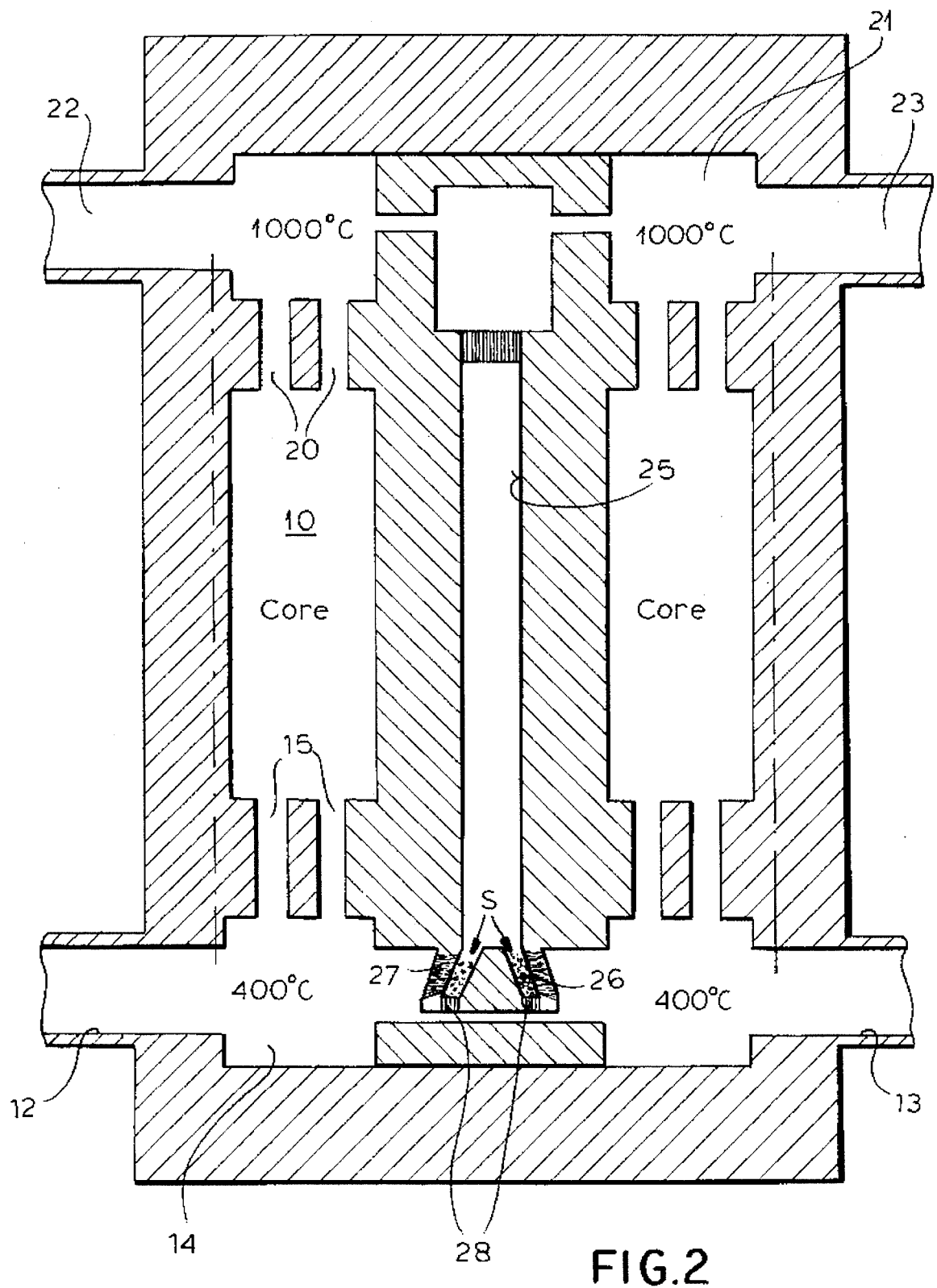
FIG. 2 is a cross section similar to FIG. 1 showing the condition on failure of coolant flow.

As can be seen from FIG. 2, however, should there be a failure of the coolant flow (note the lack of arrows 36 in the reactor), an accumulation S of the particles due to gravity in the space 26 removes the fuel particles from the reactive region and thus reduces the reactivity by the order of 0.5 to 1%, leading to hot shutdown of the reactor.

In the embodiment of FIGS. 1 and 2, the branched flow passes through a region of the reactor which is free from nuclear fuel until fuel particles are entrained into it namely the upper part of column 11 above the particle-collecting space in arriving at and upon departing from the compartment 25, and in the case of a breeder reactor, can pass through the breed-blanket shell and in the case of a thermal reactor through the reflector as may be desired.

The space 26 and the volume of the fuel particles S is such that the reduction in reactivity is the 0.5 to 1% indicated.

We claim:

1. A process for the automatic stabilization of the reactivity of a neutron chain reaction of a nuclear reactor having a core containing a main body of fissionable fuel and which is fixed in position in a core vessel, said main body of fissionable fuel generating a neutron-flux zone between two horizontal planes providing said, said process comprising the steps of:

(a) providing a tubular chamber extending through said neutron-flux zone, said tubular chamber being closed on each end by sieves and containing fissionable fuel particles constituting a minor body of fissionable fuel, said tubular chamber having an upper end substantially at an upper one of said planes and a lower end extending below a lower one of said planes;

(b) entraining said fissionable fuel particles of said minor body of fissionable fuel upwardly in said tubular chamber in a coolant flow from a location in said chamber below said zone into said zone, said coolant flow passing into said chamber through one of said sieves at said lower end and out of said chamber through another of said sieves at said upper end;

(c) providing at said location below said zone and said lower one of said planes a space in said chamber for accumulation of said fissionable fuel particles out of said neutron-flux zone, said coolant flow maintaining said fissionable fuel particles of said minor body of fissionable fuel in said zone; and (d) automatically causing said fissionable fuel particles of said minor body of fissionable fuel to collect by gravity in said space upon a failure of upward entrainment of said fissionable fuel particles of said minor body of fissionable fuel in said coolant flow, thereby reducing the reactivity of said chain reaction, said space and the fissionable fuel particles of said minor body of fissionable fuel collected therein in step (d) being dimensioned to influence said reactivity by substantially 0.5% to 1%.

2. The process defined in claim 1 wherein said fissionable fuel particles of said minor body of fissionable fuel are coated nuclear fuel particles, said coolant flow is a stream of coolant branched from a main coolant stream of said nuclear reactor and passes through said chamber in a direction opposite an action of gravity on said particles in said chamber, and said coolant flow is discharged from a top of said chamber upon sieving of said particles therefrom.

3. The process defined in claim 2 wherein said particles of said minor body of fissionable fuel are formed by nuclear fuel of a greater enrichment than nuclear fuel of said main body.

* * * * *